(12) United States Patent
Sen et al.

(10) Patent No.: US 11,356,932 B2
(45) Date of Patent: Jun. 7, 2022

(54) CHANNEL SCAN BASED ON MOBILITY STATE

(71) Applicant: Hewlett Packard Enterprise Development LP, Houston, TX (US)

(72) Inventors: Souvik Sen, Mountain View, CA (US); Anil Gupta, Shrewsbury, MA (US); Manfred R. Arndt, Folsom, CA (US); Jung Gun Lee, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 600 days.

(21) Appl. No.: 15/307,888

(22) PCT Filed: Jun. 30, 2014

(86) PCT No.: PCT/US2014/044916
§ 371 (c)(1),
(2) Date: Oct. 31, 2016

(87) PCT Pub. No.: WO2016/003424
PCT Pub. Date: Jan. 7, 2016

(65) Prior Publication Data
US 2017/0086134 A1     Mar. 23, 2017

(51) Int. Cl.
*H04W 48/16*     (2009.01)
*H04L 43/16*     (2022.01)
*H04W 4/02*      (2018.01)
*H04W 48/20*     (2009.01)
*H04W 64/00*     (2009.01)

(52) U.S. Cl.
CPC ............. *H04W 48/16* (2013.01); *H04L 43/16* (2013.01); *H04W 4/027* (2013.01); *H04W 48/20* (2013.01); *H04W 64/006* (2013.01)

(58) Field of Classification Search
None
See application file for complete search history.

(56) References Cited

U.S. PATENT DOCUMENTS

| | | | | |
|---|---|---|---|---|
| 5,235,316 | A | * | 8/1993 | Qualizza ................. G01S 7/58 180/167 |
| 8,165,150 | B2 | | 4/2012 | Aweya et al. |
| 9,125,113 | B2 | * | 9/2015 | Prasad .............. H04W 36/0088 |

(Continued)

FOREIGN PATENT DOCUMENTS

WO    WO-2013045758    4/2013

OTHER PUBLICATIONS

Cutting Wi-Fi Scan Tax for Smart Devices—Tianxing—Computer Science Department Darthmouth College, Hanover, NH—Advised by Xia Zhou and Andrew Campbell—XP55398371A—53 pages—Dartmouth Computer Science Technical Report TR2014-752—Jun. 3, 2014.

(Continued)

*Primary Examiner* — Jeffrey M Rutkowski
*Assistant Examiner* — Ning Li
(74) *Attorney, Agent, or Firm* — Hewlett Packard Enterprise Patent Department

(57) ABSTRACT

Described herein are techniques for performing a channel scan based on a mobility state of a device. The mobility state of a device relative to an access point may be determined using time-of-flight information. A channel scan may be performed based on the mobility state determination.

19 Claims, 5 Drawing Sheets

(56) References Cited

U.S. PATENT DOCUMENTS

| | | | |
|---|---|---|---|
| 9,510,262 B2* | 11/2016 | Brisebois | H04W 48/16 |
| 2006/0217132 A1 | 9/2006 | Drummond-Murray et al. | |
| 2007/0010261 A1* | 1/2007 | Dravida | G01S 5/0009 |
| | | | 455/456.3 |
| 2007/0127422 A1 | 6/2007 | Belcea | |
| 2008/0042912 A1* | 2/2008 | Lee | H04L 12/4641 |
| | | | 343/713 |
| 2008/0064404 A1* | 3/2008 | Zhang | H04W 36/08 |
| | | | 455/436 |
| 2008/0075035 A1* | 3/2008 | Eichenberger | H04W 36/08 |
| | | | 370/328 |
| 2008/0117879 A1* | 5/2008 | Wu | H04W 36/36 |
| | | | 370/332 |
| 2008/0186917 A1* | 8/2008 | Wu | H04W 36/10 |
| | | | 370/331 |
| 2009/0103503 A1* | 4/2009 | Chhabra | H04W 48/20 |
| | | | 370/338 |
| 2009/0147697 A1* | 6/2009 | Malik | H04W 48/08 |
| | | | 370/254 |
| 2009/0270042 A1 | 10/2009 | Miscopein et al. | |
| 2009/0296652 A1* | 12/2009 | Rudowicz | H04W 48/16 |
| | | | 370/331 |
| 2011/0013600 A1 | 1/2011 | Kim et al. | |
| 2011/0038372 A1* | 2/2011 | Wijayanathan | H04L 61/6059 |
| | | | 370/389 |
| 2011/0151842 A1 | 6/2011 | Olincy et al. | |
| 2011/0217918 A1* | 9/2011 | Rechberger | H04B 1/1027 |
| | | | 455/1 |
| 2012/0014425 A1 | 1/2012 | Zhuang et al. | |
| 2012/0124088 A1* | 5/2012 | Meshkati | H04W 48/16 |
| | | | 707/771 |
| 2013/0191019 A1 | 7/2013 | Pakzad | |
| 2013/0210425 A1* | 8/2013 | Nagaraj | H04B 1/3805 |
| | | | 455/432.1 |
| 2013/0244664 A1 | 9/2013 | Song et al. | |
| 2013/0301497 A1 | 11/2013 | Gonikberg et al. | |
| 2013/0308470 A1 | 11/2013 | Bevan et al. | |
| 2013/0331106 A1* | 12/2013 | Makh | H04W 36/32 |
| | | | 455/440 |
| 2014/0079043 A1 | 3/2014 | Montemurro et al. | |
| 2014/0153434 A1* | 6/2014 | Kokovidis | H04W 4/70 |
| | | | 370/252 |
| 2014/0171088 A1* | 6/2014 | Edara | H04W 36/32 |
| | | | 455/440 |
| 2014/0204793 A1* | 7/2014 | Ben-Haim | H04W 24/00 |
| | | | 370/253 |
| 2014/0274044 A1* | 9/2014 | Lee | H04W 48/16 |
| | | | 455/434 |
| 2014/0341069 A1* | 11/2014 | Alon | H04W 48/16 |
| | | | 370/254 |
| 2015/0006616 A1* | 1/2015 | Walley | H04L 67/16 |
| | | | 709/203 |
| 2015/0131460 A1* | 5/2015 | Sridhara | G01S 11/06 |
| | | | 370/252 |
| 2015/0181553 A1* | 6/2015 | Segev | H04W 64/003 |
| | | | 455/456.1 |
| 2015/0189557 A1* | 7/2015 | Touati | H04W 36/0066 |
| | | | 370/332 |
| 2015/0221194 A1* | 8/2015 | Sarkar | G08B 13/2465 |
| | | | 340/870.16 |
| 2015/0350832 A1* | 12/2015 | Chen | H04W 4/023 |
| | | | 455/457 |
| 2015/0358890 A1* | 12/2015 | Xu | H04W 48/16 |
| | | | 455/437 |

OTHER PUBLICATIONS

Li Sun et al, Bringing Mobility-Awareness to WLANs using PHY Layer Information, XP55398374A, 13 Pgs., CoNEXT 14, Dec. 2-5, 2014, Sydney, Australia.

M. Ciurana et al, A robust to multi-path ranging technique over IEEE 802.11 networks—XP 19832834A, 11 Pgs, Wireless Netw (2010) 16:943-953—Published online: Apr. 29, 2009.

Muthukrishnan, K et al, "Using Time-of-flight for WLAN localization: feasibility study", May 11, 2006.

International Search Report and Written Opinion received for PCT Application No. PCT/US2014/044916, dated Mar. 3, 2015, 10 pages.

Kim et al., "Association Control in Mobile Wireless Networks", 2008, 9 pages.

Kim et al., "Improving energy efficiency of Wi-Fi sensing on smartphones", In INFOCOM, 2011 Proceedings IEEE, Apr. 2011, pp. 2930-2938.

Ramani et al., "SyncScan: practical fast handoff for 802.11 infrastructure networks", In INFOCOM 2005, 24th Annual Joint Conference of the IEEE Computer and Communications Societies, Proceedings IEEE, Mar. 2005, vol. 1, pp. 675-684.

Ravindranath et al., "Improving wireless network performance using sensor hints", In USENIX NSDI, 2011, pp. 281-294.

Shin et al., "Improving the latency of 802.11 hand-offs using neighbor graphs", In Proceedings of the 2nd international conference on Mobile systems, applications, and services, Jun. 2004, pp. 70-83.

Wu et al., "Footprint: cellular assisted Wi-Fi AP discovery on mobile phones for energy saving". In Proceedings of the 4th ACM international workshop on Experimental evaluation and characterization, Sep. 2009, pp. 67-76.

\* cited by examiner

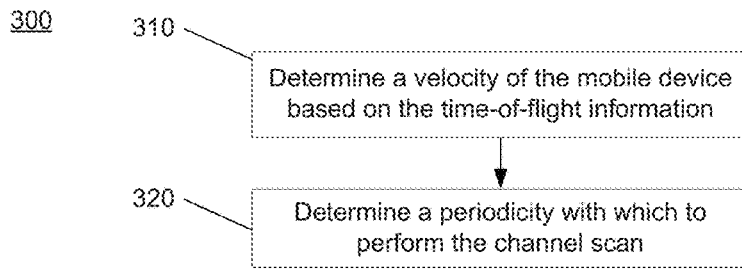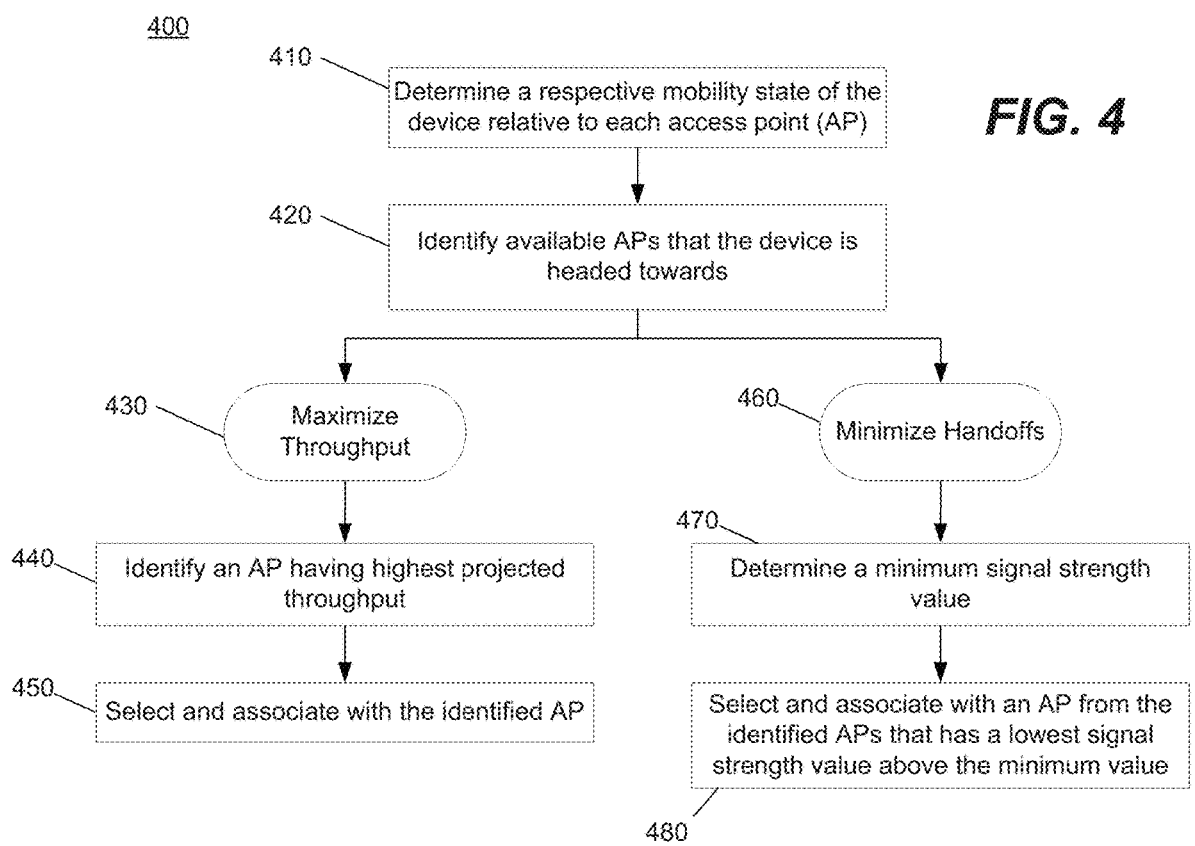

CHANNEL SCAN BASED ON MOBILITY STATE

BACKGROUND

Devices with wireless cards may perform channel scans to find available wireless access points to connect to. It may be desirable to periodically perform a channel scan even when already connected to an access point, as a better access point may be available at a later time. However, performing a channel scan can have drawbacks. For example, performing a channel scan consumes energy, which can be a valuable and scarce resource, particularly on a mobile device. Additionally, when a channel scan is performed, the device generally cannot transmit or receive other data during the scanning operation, which affects performance.

BRIEF DESCRIPTION OF DRAWINGS

The following detailed description refers to the drawings, wherein:

FIG. 3 illustrates a method to determine a periodicity with which to perform a channel scan based on mobility state information of a device, according to an example.

FIG. 4 illustrates a method to identify and select an access point for use in the method of FIG. 1 according to an example.

DETAILED DESCRIPTION

Figure 1:
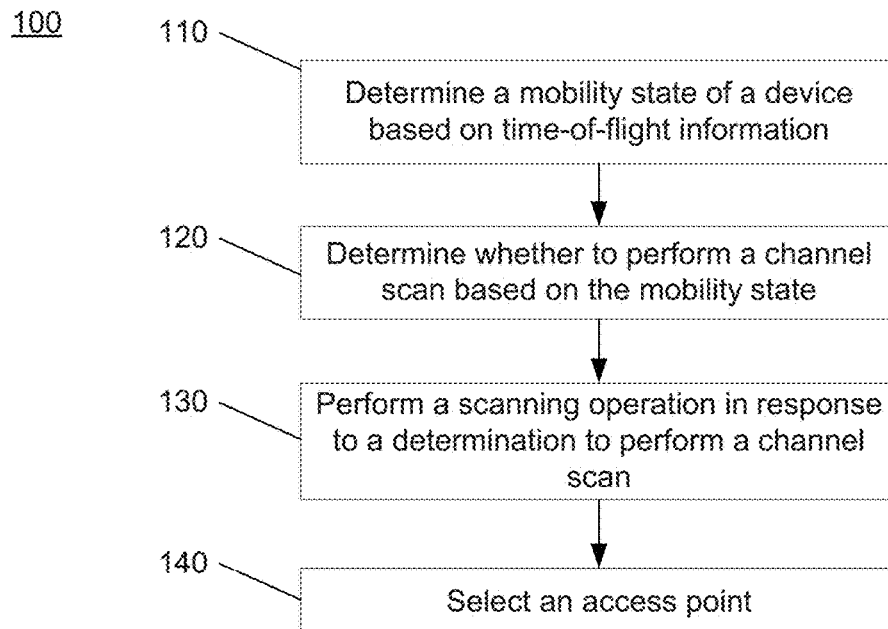
FIG. 1 illustrates a method to perform a channel scan based on a device's mobility state determined using time-of-flight information, according to an example.
Figure 2:
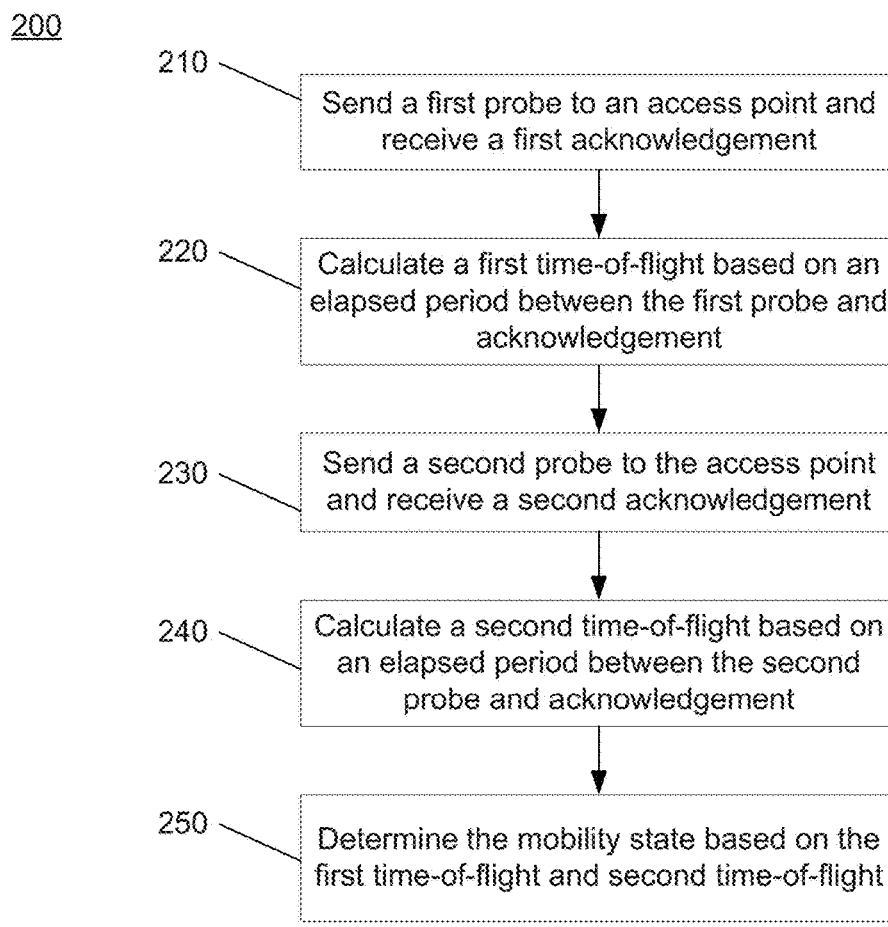
FIG. 2 illustrates a method to determine a mobility state of a device based on time-of-flight information for use in the method of FIG. 1, according to an example.

Even if a device already has a viable connection to an access point, performing a channel scan can be beneficial because a better connection with another access point may be available. This can be especially true if a device is mobile and the strength of the connection with the current access point is decreasing. However, performing repeated channel scans can have drawbacks, such as excessive power consumption and a decrease in performance.

In an example, a method may be provided to perform a channel scan based on mobility information. The method may include determining a mobility state of the device based on time-of-flight information. For example, the time-of-flight information may include multiple measurements of time-of-flight between a device and an access point. Each time-of-flight may be a measure of the time between sending of a probe message from the device to the access point and receiving an acknowledgement from the access point. By determining multiple time-of-flights, it may be determined whether the device is in a mobile state (i.e., currently moving) or in a static state (i.e., not moving). Furthermore, in the case of a moving device, the directional heading of the device (e.g., toward or away from the access point) and velocity of the device may be determined. The method may further include determining whether to perform a channel scan based on the determined mobility state. For example, it may be determined to perform a channel scan if the device is moving away from the access point, as that may imply that the strength of the connection is decreasing and will likely continue to decrease. The method may then include performing a scanning operation in response to a determination to perform a channel scan.

As a result of the scanning operation, other available access points may be discovered. One of these access points may be selected for wireless connectivity, and the device can disconnect from the currently connected access point and connect to the selected access point. Accordingly, by using mobility state to determine when to perform a channel scan, the frequency of channel scans may be decreased while increasing the likelihood that a channel scan will be performed only when there is a greater likelihood that a more suitable access point may be available. Additionally, as will be described in more detail later, an access point may be selected based on the mobility state information so as to minimize the number of handoffs (i.e., the number of times that the device changes access points) while maintaining a minimum level of signal strength. Additional examples, advantages, features, modifications and the like are described below with reference to the drawings.

FIGS. 1-4 illustrate methods usable to perform a channel scan based on a device's mobility state determined using time-of-flight information, according to various examples. Methods 100-400 may be performed by a computing device or computer, such as mobile device 510 or computer 710. Computer-readable instructions for implementing methods 100-400 may be stored on a computer readable storage medium. These instructions as stored on the medium are referred to herein as "modules" and may be executed by a computer.

Figure 5:
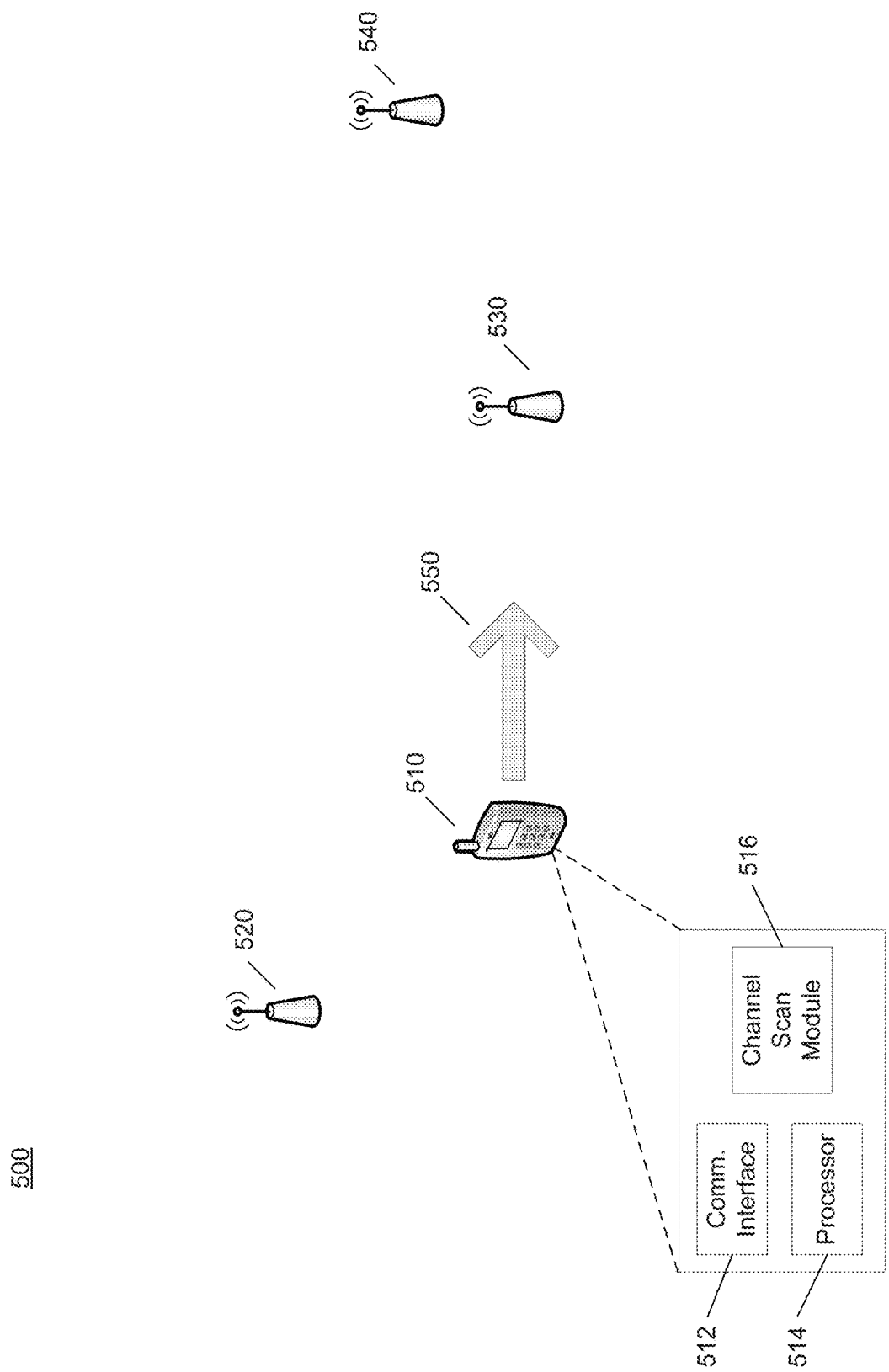
FIG. 5 illustrates a device that can perform a channel scan based on the device's mobility state determined using time-of-flight information, according to an example.

Methods 100-400 will be described here relative to environment 500 of FIG. 5. Environment 500 may include a mobile device 510 and various access points 520-540. Mobile device 510 may be a mobile phone, smartphone, tablet computer, laptop computer, or the like, and may include wireless access capability, such as through a wireless card. Mobile device 510 may include a communication interface 512 (e.g., wireless card), a processor 514, and a channel scan module 516, which can be executed by processor 514. Channel scan module 516 may be configured to perform methods 100-400 of FIGS. 1-4 and/or instructions 732-736 of FIG. 7. Access points (APs) 520-540 may be wireless access points that provide wireless network access to devices. The APs may implement known wireless networking protocols, such as IEEE 802.11 variations.

Mobile device 510 may include one or more controllers and one or more machine-readable storage media. A controller may include a processor and a memory for implementing machine readable instructions. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

The controller may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, mobile device 510 may include one or more machine-readable storage media separate from the one or more controllers.

Method 100 may be used to perform a channel scan based on a device's mobility state determined using time-of-flight information, according to an example. For illustration, method 100 will be described as executed by mobile device 510.

Method 100 may begin at 110, where the mobility state of device 510 may be determined. The mobility state may be determined relative to an access point based on time-of-flight (ToF) information. The ToF may capture the propagation delay between a transmitter at device 510 and a receiver at one of the APs 520-540.

For example, method 200 may be performed to determine the mobility state of device 510. At 210, device 510 may send a first probe to an AP, such as AP 520. In one example, the probe may be a NULL data frame. For example, device 510 may send a NULL data frame that includes an 802.11 frame control field, type 10 and subtype 0100 or a QoS NULL data frame that includes an 802.11 frame control filed, type 10 and subtype 1100. The AP 520, even if it is not associated with the device 510, may reply with an acknowledgement (ACK), for example, as specified in the IEEE 802.11 standard. Thus, at 220, device 510 may receive a first acknowledgement, which acknowledges having received the first probe. At 230, device 510 may calculate a ToF value based on an elapsed period between sending the first probe and receiving the first acknowledgement. At 240, device 510 may send a second probe to the AP 520 at a later time (relative to sending the first probe). At 250, device 510 may receive a second acknowledgement to the second probe. At 260, device 510 may calculate a second ToF based on an elapsed period between sending the second probe and receiving the second acknowledgement. At 270, device 510 may determine its mobility state based on the first ToF and second ToF.

Figure 6:
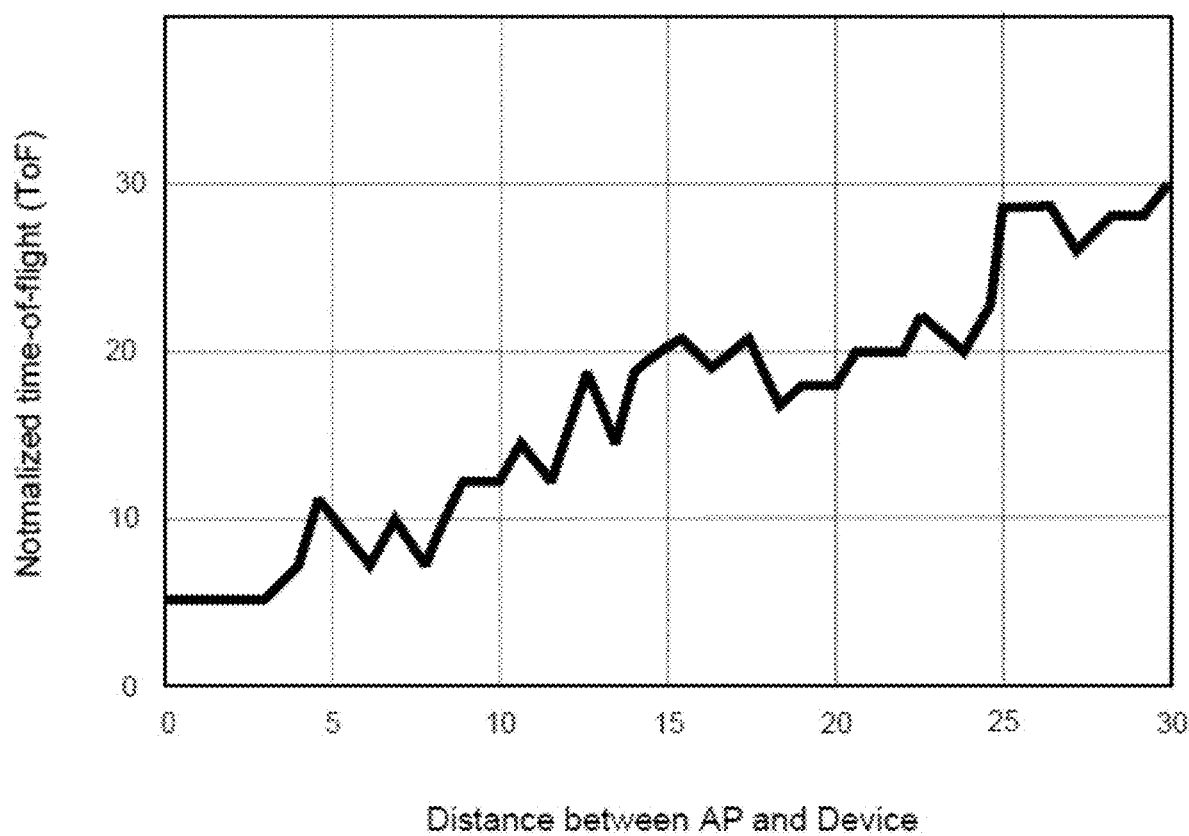
FIG. 6 illustrates normalized time-of-flight values between an access point and a device, according to an example.

To illustrate how the mobility state may be determined. FIG. 6 depicts normalized ToF values between an AP and a device that uses the AP, according to an example. The ToF is proportional to the distance between a transmitter (e.g., at the device 510 or one of the APs) and a receiver (e.g., at the other one of the APs or the device 510). A change in the ToF values may be used to determine a mobility state of device 510. In particular, for example, the ToF information may be used to determine (1) whether device 510 is static (i.e., stationary/not moving) or mobile (i.e., moving), (2) a directional heading of device 510 relative to the AP (i.e., whether the device is approaching or moving away from the AP), and (3) a velocity of device 510 relative to the AP.

For instance, if the ToF is not changing over time, it may be determined that device 510 is static. If the ToF is changing, it may be determined that device 510 is mobile. Note that a threshold may be used to determine a mobile vs, static state. For example, some variation in ToF over time may be allowed to account for deviations in ToF due to minor movement, environmental conditions, or the like. Once the threshold is met, however, it may be assumed that the deviations are significant enough that the device 510 is indeed moving a significant amount. In addition, if the ToF is increasing (e.g., see FIG. 6), it may be determined that the device 510 is heading away from the AR Otherwise if the ToF is decreasing, it may be determined that the device 510 is approaching the AP. Finally, velocity of the device 510 relative to the AP may be determined using the following equation:

$$= \frac{ToF1 - ToF2}{t2 - t1},$$

where v is the velocity, ToF1 is the first ToF, ToF2 is the second ToF, t1 is the time when the first probe was sent, and t2 is the time when the second probe was sent. A positive velocity would indicate velocity toward the AP while a negative velocity would indicate velocity away from the AP. Multiple successive determinations of ToF over time can be performed to confirm the correctness of the determined mobility state.

Returning to method 100, at 120 it may be determined whether to perform a channel scan based on the mobility state. A channel scan is a scan of a particular radio frequency (channel) to identify available APs. The channel scan may be an active scan, in which the mobile device 510 transmits a probe and waits for acknowledgements from available APs. It may be determined to perform a channel scan if the mobility state of device 510 is "mobile" and to not perform a channel scan if the mobility state of device 510 is "static". This is because if device 510 is mobile, it may be more likely that a better or more acceptable AP will be available, while if the device 510 is static, it may be less likely that a better or more acceptable AP will be available. Nonetheless, even if determined that the device 510 is static, a channel scan may still be performed if the signal strength of a currently associated AP falls below a signal strength threshold value. This can help to ensure a certain level of connectivity regardless of mobility state.

A similar determination may be made based on a determined velocity of the device 510. Turning to FIG. 3, method 300 begins at 310 where a velocity of device 510 may be determined based on ToF information, such as described above. At 320, a periodicity with which to perform a channel scan may be determined based on the velocity of device 510. For example, if the velocity is below a first threshold value, it may be determined to not perform a channel scan unless signal strength of the AP associated with device 510 falls below a signal strength threshold value. On the other hand, if the determined velocity is above the first threshold value, the periodicity may be set to a value proportional to the determined velocity of the device. For example, the higher the velocity is, the higher the more frequently device 510 can perform a channel scan. There may also be a second threshold value, where if the determined velocity is above the second threshold value, the periodicity is set to a predetermined value. The predetermined value may serve as a maximum periodicity for performing the channel scan, to account for the case where device 510 is moving very quickly (e.g., in a car, train, or plane). In some examples, the periodicity may be set in other ways, such that the periodicity is not proportional to the determined velocity.

At 130, a scanning operation may be performed in response to a determination to perform a channel scan. For example, channel scan module 516 can cause the communication interface 512 (e.g., via a wireless card) of to perform a channel scan at predetermined intervals according to the determined periodicity. Accordingly, a channel scan may be performed independent of the current signal strength value of an AP that device 510 is associated with.

At 140, device 510 may select an AP to associate with from a list of available APs identified during the channel scan. An AP may be selected from the list based on various techniques. In one example, an available AP having a highest signal strength may be selected for association. The signal strength of each available AP may be determined by device 510 via its wireless card. Other criteria may be examined, as well. For example, FIG. 4 illustrates a method 400 to identify and select an access point, according to an example.

Method 400 may begin at 410, where a respective mobility state of device 510 relative to each available AP may be determined. For example, referring to environment 500, the mobility state of device 510 may be determined relative to each of AP 520, AP 530, and AP 540. The mobility state may be determined relative to each AP based on ToF information using the techniques described earlier, such as method 200. The arrow 550 indicates that device 510 is moving toward APs 530 and 540, and away from AP 520. Thus, for AP 520, it may be determined that device 510 is mobile, is moving away from AP 520, and is moving at velocity X relative to AP 520. For AP 530, it may be determined that device 510 is mobile, is moving toward AP 530, and is moving at velocity Y relative to AP 530. For AP 540, it may be determined that device 510 is mobile, is moving toward AP 540, and is moving at velocity Z relative to AP 540. Note that the determined velocity relative to each AP may differ due to the different locations of the APs.

At 420, available APs that device 510 is headed towards may be identified. For example, APs 530 and 540 may be identified as available APs in this regard. AP 520 would not be identified because device 510 is moving away from AP 520. After 420, a selection technique may be used chosen to select one of the identified available APs. Two example selection techniques are a selection technique that attempts to maximize throughput (430) and a selection technique that attempts to minimize the number of handoffs (460).

For the maximize throughput selection technique (430), method 400 may proceed to 440 where an AP (from the APs identified in block 420) having the highest projected throughput may be identified. The throughput may be projected based on various criteria, such as signal strength of the AP and the 802.11 protocol that is supported by the AP. At 450, the AP identified in block 440 may be selected and associated with. Referring to environment 500, AP 530 would likely be selected using this selection technique because AP 530 is closer to device 510 and thus probably would have a higher signal strength than AP 540 and, thus, a higher projected throughput. The maximize throughput selection technique may be used when device 510 is executing an application requiring high throughput, such as a bulk transfer application (e.g., file download/upload, video or audio download/upload, etc.).

For the minimize handoffs selection technique (460), method 400 may select an AP that is expected to provide the longest lasting viable connection (i.e., a connection likely to provide at least the minimum signal strength for the longest period of time). At 470, a minimum signal strength value may be determined. The minimum signal strength value may be a minimum signal strength value that is deemed acceptable for connection purposes. The minimum value may be a set, predetermined value. Alternatively, the minimum value may be dependent on the type of application being executed on device 510 or on the bandwidth requirements of an application being executed on device 510.

At 480, an AP may be selected (from the APs identified in block 420) and associated with, where the AP has a lowest signal strength value above the minimum value. Referring to environment 500, assuming AP 540 has a signal strength above the minimum value, AP 540 would likely be selected using this selection technique because AP 540 is farther from device 510 and would thus likely have a weaker signal strength than AP 530. The reason selection of AP 540 may minimize the number of handoffs is because device 510 would probably be able to stay associated with AP 540 for a longer period of time than with AP 530 due to the mobility direction of device 510. In other words, by associating with AP 540, device 510 may put off having to re-associate with a new AP because the connection with AP 540 should be viable for a longer period of time than it would have been with AP 530. The minimize handoffs selection technique may be used when device 510 is executing an application that is sensitive to latency or jitter, such as a real-time application involving audio or video conferencing. In such case, interrupting the connection for channel scans may result in degraded performance, so a longer lasting connection would be preferred.

Figure 7:
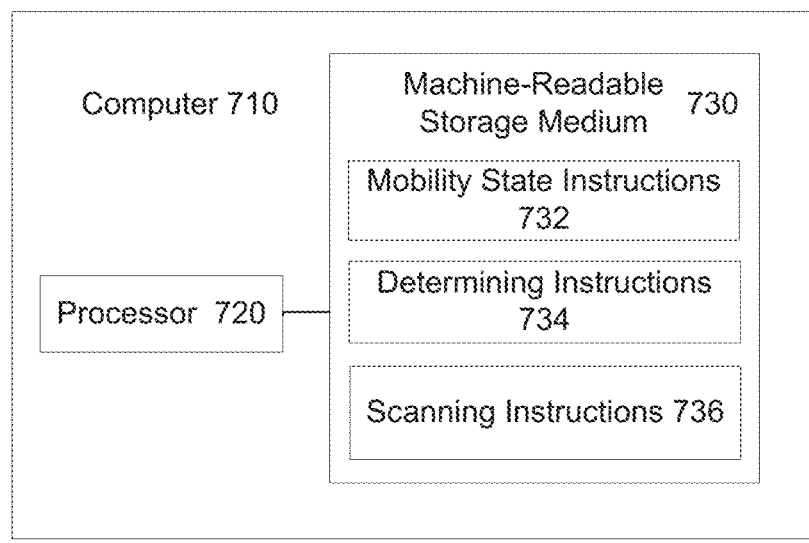
FIG. 7 illustrates a computer-readable medium to perform a channel scan based on a device's mobility state determined using time-of-flight information, according to an example.

FIG. 7 illustrates a computer-readable medium to perform a channel scan based on a device's mobility state determined using time-of-flight information, according to an example. Computer 710 may be a computing device such as mobile device 510, such as a laptop, tablet, smartphone, PDA, or the like. The computer may include one or more controllers and one or more machine-readable storage media, as described with respect to mobile device 510, for example.

Processor 720 may be at least one central processing unit (CPU), at least one semiconductor-based microprocessor, other hardware devices or processing elements suitable to retrieve and execute instructions stored in machine-readable storage medium 730, or combinations thereof. Processor 720 can include single or multiple cores on a chip, multiple cores across multiple chips, multiple cores across multiple devices, or combinations thereof. Processor 720 may fetch, decode, and execute instructions 732-736 among others, to implement various processing. As an alternative or in addition to retrieving and executing instructions, processor 720 may include at least one integrated circuit (IC), other control logic, other electronic circuits, or combinations thereof that include a number of electronic components for performing the functionality of instructions 732-736. Accordingly, processor 720 may be implemented across multiple processing units and instructions 732-736 may be implemented by different processing units in different areas of computer 710.

Machine-readable storage medium 730 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 730 can be computer-readable and non-transitory. Machine-readable storage medium 730 may be encoded with a series of executable instructions for managing processing elements.

The instructions 732-736 when executed by processor 720 (e.g., via one processing element or multiple processing elements of the processor) can cause processor 720 to perform processes, for example, methods 100-400, and/or variations and portions thereof.

For example, mobility state instructions 732 may cause processor 720 to determine a mobility state of computer 710 based on time-of-flight (ToF) information calculated with respect to an access point (AP). Determining instructions 734 can cause processor 720 to determine whether to perform a channel scan based on the determined mobility state. Scanning instructions 736 can cause processor 720 to perform a scanning operation in response to a determination to perform a channel scan. Available APs may be identified based on the scanning operation. One of the APs may be selected for association using a selection technique.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method performed by a processor of a device, the method comprising:
   determining, with a processor of a device, a mobility state of the device with respect to an access point based on multiple time-of-flight measurements that are proportional to a distance between the device and the access point;
   determining, with the processor of the device, whether to perform a channel scan based on the determined mobility state of the device; and
   performing, with the processor of the device, in response to the determination to perform the channel scan, the channel scan to find additional available wireless access points;
   after performing the channel scan, selecting one of a plurality of available access points according to a first selection technique attempting to minimize a number of hand-offs by:
      determining a respective mobility state of the device relative to each available access point based on time-of-flight information;
      identifying, based on the determined mobility states, available access points that the device is headed towards;
      determining a minimum signal strength threshold value based on a bandwidth requirement of an application being executed on the device; and
      selecting an access point from the identified access points that has a lowest signal strength value above the minimum signal strength threshold value.

2. The method of claim 1, wherein the mobility state is determined with respect to the access point, the mobility state comprising (1) a directional heading indicating whether the device is moving toward or away from the access point and (2) a velocity with which the device is moving toward or away from the access point.

3. The method of claim 1, wherein determining the mobility state of the device based on time-of-flight information comprises:
   sending a first probe to the access point at a first time;
   receiving a first acknowledgement to the first probe;
   calculating a first time-of-flight based on an elapsed period between sending the first probe and receiving the first acknowledgement;
   sending a second probe to the access point at a second time later than the first time;
   receiving a second acknowledgement to the second probe; and
   calculating a second time-of-flight based on an elapsed period between sending the second probe and receiving the second acknowledgement; and
   determining the mobility state based on the first time-of-flight and the second time-of-flight.

4. The method of claim 3, further comprising:
   determining a velocity of the mobile device relative to the access point based on the following equation:

$$v = \frac{ToF1 - ToF2}{t2 - t1},$$

where v is the velocity, ToF1 comprises a first measure of time between sending of a first probe message and receiving a first acknowledgement corresponding to the first probe message, ToF2 comprises a second measure of time between sending of a second probe message and receiving a second acknowledgement corresponding to the second probe message, t1 is a first time at which the first probe message was sent, and t2 is a second time at which the second probe message was sent.

5. The method of claim 1, further comprising:
   determining a directional heading of the mobile device relative to the access point based on whether a second time-of-flight is increasing or decreasing relative to a first time-of-flight.

6. The method of claim 1, further comprising:
   determining a periodicity with which to perform the channel scan based on the mobility state, wherein the periodicity is proportional to a determined velocity of the device.

7. The method of claim 6, further comprising:
   performing the channel scan when a signal strength of an access point associated with the device falls below a first predetermined value, and
   setting the periodicity to a second predetermined value when the determined velocity is above a second threshold.

8. The method of claim 1, further comprising:
   associating with the selected access point.

9. The method of claim 8, wherein selecting one of the plurality of available access points is performed according to a second selection technique attempting to maximize throughput by:
   determining signal strength of each of the available access points; and
   selecting an access point having the highest signal strength.

10. The device of claim 1, wherein a second selection technique attempts to maximize throughput, the second selection technique comprising:
    determining signal strength of each of the available access points; and selecting an access point having the highest signal strength.

11. The device of claim 10, wherein the processor is to choose the first or second selection technique from a plurality of selection techniques based on bandwidth requirements of an application executing on the device or based on a type of an application executing on the device.

12. The method of claim 1, wherein the minimum signal strength threshold value is further based on a type of the application being executed on the device.

13. A device comprising:
a communication interface to send probes to an access point and receive acknowledgements from the access point; and
a processor to:
calculate multiple time-of-flight measurements that are proportional to a distance between the device and the access point based on the sent probes and received acknowledgements;
determine a mobility state of the device with respect to the access point based on the multiple time-of-flight measurements;
perform a channel scan in response to a determination that the device's mobility state is active, the channel scan to find additional available wireless access points, and refrain from performing the channel scan in response to a determination that the device's mobility state is static;
select, according to a first selection technique, one of a plurality of available access points discovered during the channel scan, the first selection technique attempting to minimize a number of hand-offs by:
determining a respective mobility state of the device relative to each available access point based on time-of-flight information;
identifying, based on the determined mobility states, available access points that the device is headed towards;
determining a minimum signal strength threshold value based on a bandwidth requirement of an application being executed on the device; and
selecting an access point from the identified access points that has a lowest signal strength value above the minimum signal strength value.

14. The device of claim 13, wherein the mobility state of the device is determined based on successive calculations of time-of-flight information.

15. The device of claim 13, wherein the mobility state of the device comprises a velocity and a directional heading, the mobility state being determined based on the following equation:

$$v = \frac{ToF1 - ToF2}{t2 - t1},$$

where v is the velocity, ToF1 is a first time-of-flight calculated based on an elapsed period between sending a first probe and receiving a first acknowledgement from the access point, ToF2 is a second time-of-flight based on an elapsed period between sending a second probe and receiving a second acknowledgement from the access point, t1 is a first time at which the first probe was sent, and t2 is a second time at which the second probe was sent, wherein the directional heading is determined to be toward the access point when the velocity is positive and away from the access point when the velocity is negative.

16. The device of claim 15, wherein the processor further is to:
associate with the selected access point.

17. The device of claim 13, wherein the minimum signal strength threshold value is further based on a type of the application being executed on the device.

18. A non-transitory computer-readable storage medium storing instructions for execution by a processor, the instructions when executed causing the processor to:
determine, with the processor, a mobility state of the device with respect to an access point based on multiple time-of-flight measurements that are proportional to a distance between the device and the access point;
determine, with the processor, whether to perform a channel scan based on the determined mobility state of the device; and
perform, with the processor, in response to the determination to perform the channel scan, the channel scan to find additional available wireless access points;
after performing the channel scan, selecting one of a plurality of available access points according to a first selection technique attempting to minimize a number of hand-offs by:
determining a respective mobility state of the device relative to each available access point based on time-of-flight information;
identifying, based on the determined mobility states, available access points that the device is headed towards;
determining a minimum signal strength threshold value based on a bandwidth requirement of an application being executed on the device; and
selecting an access point from the identified access points that has a lowest signal strength value above the minimum signal strength threshold value.

19. The non-transitory computer-readable storage medium storing instructions for execution by a processor of claim 18, the instructions when executed causing the processor to:
select one of the plurality of available access points according to a second selection technique attempting to maximize throughput by:
determining signal strength of each of the available access points; and
selecting an access point having the highest signal strength.

* * * * *